Sept. 22, 1964   A. L. SCHILS ETAL   3,150,301
TAB-WOUND CAPACITOR
Filed Dec. 7, 1961

INVENTORS
ALVIN L. SCHILS
BY WALTER F. ENGLAND
Connolly and Hutz
THEIR ATTORNEYS

United States Patent Office 3,150,301
Patented Sept. 22, 1964

3,150,301
TAB-WOUND CAPACITOR
Alvin L. Schils, Nashua, and Walter F. England, Hillsborough, N.H., assignors to Sprague Electric Company, North Adams, Mass., a corporation of Massachusetts
Filed Dec. 7, 1961, Ser. No. 157,777
3 Claims. (Cl. 317—260)

This invention relates to a miniature electrostatic capacitor, and more particularly to a miniature resin encased plastic film capacitor. This application is a continuation-in-part of patent application SN 106,430 which was filed April 28, 1961.

Film capacitors are well known in the art and comprise capacitance sections having electrodes separated by and convolutely wound with plastic film dielectric ribbons. Film capacitors have been produced in both extended-foil sections and tab-wound sections. Extended-foil sections have an edge of one electrode extending from one end of the section and an edge of a second electrode extending from the opposite end of the section. Tab-wound sections have dielectric material extending beyond both edges of the electrodes with tabs contacting the individual electrodes and extending beyond the edges of the dielectric material. Tab-wound sections offer several distinct advantages over extended-foil sections, notably the savings in space and material afforded by utilization of substantially the entire electrode width for the capacitive overlap between electrodes. A processing advantage of the tab-wound section is that a tab may be laid into the winding in contact with an electrode without being mechanically affixed thereto, because shrinking of the plastic films during the curing step will secure the tabe in intimate electrical contact with the electrode.

A disadvantage of all prior art film capacitors is the difficulty encountered in securing terminal leads in axial alignment with the capacitance sections. This disadvantage is aggravated in miniature film capacitors of tab-wound construction, because the extremely flexible tab offers no support for the mounting of a lead-wire. Poorly aligned and poorly secured lead-wires are not acceptable in the modern-day automated assembly line because the lead-wires foul the assembly equipment.

It is an object of this invention to provide a tab-wound film capacitor that does not suffer the disadvantages of the prior art.

It is another object of this invention to provide a tab-wound film capacitance section having axially aligned lead-wires firmly secured to the section.

These and other objects of this invention will become more apparent by consideration of the following description and claims taken together with the accompanying drawing, in which:

Figure 1:
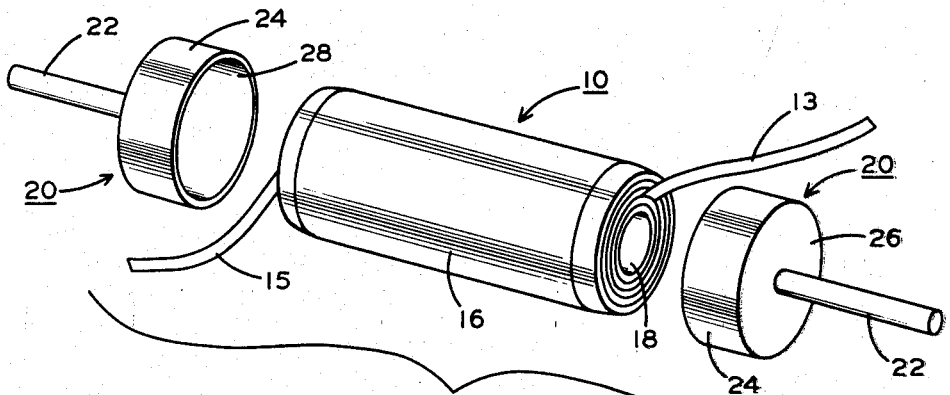
FIGURE 1 is a perspective in exploded fashion of a capacitance section and terminal assemblies according to this invention.

In general the objects of this invention are attained by providing a tab-wound film capacitance section with end-cap assemblies and an encompassing coating of resinous material.

More particularly, the objects of the invention are attained by providing a miniature tab-wound film capacitance section with end-cap assemblies having axial lead-wires secured thereto, and a deposited coating of resinous material that extends over both the section and the end-caps. The advantages of this invention are especially realized in miniature capacitance sections of thin wall and small diameter.

The drawing shows a capacitance section 10 having electrodes 12 and 14 convolutely wound with plastic film dielectric material 16 in conventional tab-wound construction. Tabs 13 and 15 extend from electrodes 12 and 14, respectively, out opposite ends of capacitance section 10. The tab-wound construction of capacitance section 10 permits substantially complete capacitive overlap of electrodes 12 and 14. Dielectric material 16 extends beyond both edges of the electrodes, with only the tabs extending to provide electrical contact to the electrodes. While it will be understood that the construction of this invention is not limited in size, it is particularly adapted to miniature capacitors of less than 1 inch in length and less than ⅓ inch in diameter.

Electrodes 12 and 14 may be of any of the conventional materials used in electrostatic capacitors. Thus the electrodes may consist of discrete foils of aluminum or other generally recognized capacitance foils such as tin-lead alloys. Although the preferred embodiment utilizes discrete foils, it will be understood that many of the advantages of this invention are obtained by employing metallized strata on the dielectric material.

In a like manner, dielectric material 16 may comprise any of the plastic film dielectric materials that are conventionally employed in electrostatic capacitors. However, for the best exercise of this invention it is desired that dielectric material 16 be of the well-known plastic films that are used in "uncased" capacitors, so as to permit the preferred embodiment of attaching terminals to the capacitance section. The plastic films that are particularly desirable in the so-called "uncased" capacitors (non-hermetically sealed) to which this invention is particularly directed are those materials that produce capacitance sections that are the least sensitive to moisture pick-up. The capacitor construction of this invention has been found to be particularly adapted to the use of polyester films and vinyl polymer films; and more particularly to the use of polyethylene terephthalate (Mylar) and poly 1, 4 cyclohexylenedimethylene terephthalate (Terafilm) for the polyester films, and polystyrene for the vinyl polymer films.

In accordance with conventional film capacitor practice, capacitance section 10 is preferably converted to a relatively rigid and self-sustaining tubular body by heat treatment of the convolute winding of electrodes and plastic films. The resulting structure securely locks tabs 13 and 15 in intimate engagement with their respective electrodes. To ensure against tab displacement during processing, it is within the scope of this invention to weld each tab to its foil by known spot-welding techniques, e.g. capacitive-discharge welding. It will be understood that other known methods of welding are within the concept of this invention, e.g. ultrasonic welding.

The prior art practice of attaching terminal lead-wires to tabs has not resulted in a product able to withstand, with any degree of consistency or reproducibility, the various vibration and pull-test requirements of the industry. Moreover the prior art has not produced a product that consistently provides lead-wires in the axial alignment required by automated assembly apparatus.

This invention makes a distinct departure from the prior art methods of terminating tab-wound capacitance sections by utilizing terminals 20, which are essentially a cup-shaped member 24 integrated to a lead-wire 22. The present state of the welding art is such that terminals 20 can be consistently provided with lead-wires 22 which are centrally disposed and axially aligned with cups 24. An alternate method of fabricating end-caps 20 is to swage a lead-wire 22 into a centrally located square hole in the bottom 26 of cup 24 and thereafter hot tin the unit. Lead-wire 22 and cup 24 may be made of any suitable electrically conductive material. In the preferred embodiment of this invention cup 24 has a generally flat bottom 26 that is substantially normal to circumferentially straight wall 28.

Figure 2:
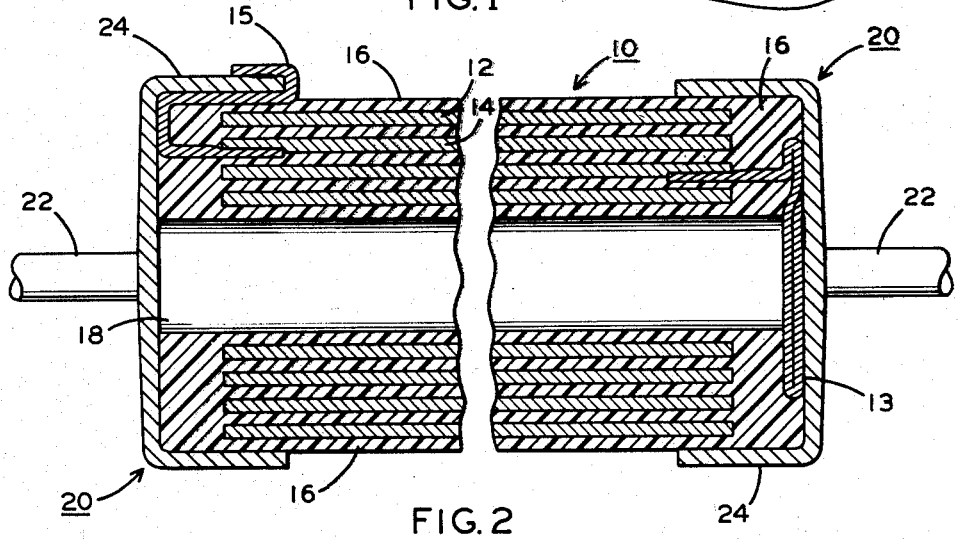
FIGURE 2 is a cross-section of an assembled capacitor according to this invention.

FIGURE 2 shows a terminal 20 positioned on each end of capacitance section 10. Tab 13 which is in contact with electrode 12 is shown as being welded to the bottom 26 of cup 24 by conventional spot-welding techniques. The excess length of tab 13, that remains after terminal 20 is positioned on capacitance section 10, is folded in accordion fashion at the end of the section and abuts against the flat bottom 26 of cup 24. Tab 15 which provides electrical contact to electrode 14 is shown in FIGURE 2 as being drawn flat against the end of capacitance section 10 and then brought out around end cap 20 and spot welded to the exterior of side wall 28. It will be understood that in commercial production both tabs will be joined to their respective end caps by one of the methods depicted in FIGURE 2.

Axial alignment of lead-wires 22 with capacitance section 10 is produced by firmly seating terminals 20 against the ends of section 10 with the cylindrical wall 28 of cup-shaped member 24 preventing lateral movement by engagement with the outer wraps of dielectric material 16. Terminals 20 are fused to capacitance section 10 by heating the assembly to flow the film into intimate contact with both bottom 26 and side-walls 28. This bond between plastic film material 16 and terminal 20 accounts for the ability of the capacitor to withstand and exceed the pull-tests and vibration tests which are designed to establish the durability of capacitor terminations. The substantial area of plastic to metal bonding that is afforded by the plastic ends of tab-wound capacitance section 10 to the bottom 26 of cup 24 securely anchors the terminal to the section. The bonding of side wall 28 to the outer wrap 16 of section 10 increases the anchoring and provides lateral stability.

The wall 28 thus constitutes an essential feature of the termination; however the length of the wall is not critical. It has been found that longer walls can be used with polyester films than with vinyl polymer films. The preferred wall for polystyrene sections does not extend over neck 19 of section 10 to avoid thinning the dielectric at the neck.

Figure 3:
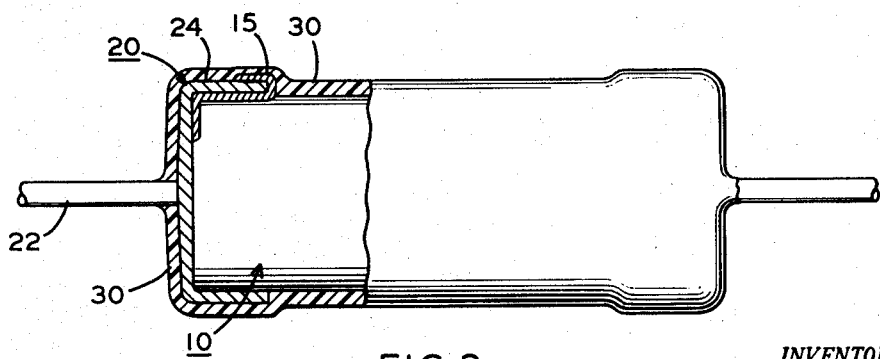
FIGURE 3 is a partial cross-section of a completed encased capacitor constructed according to this invention.

FIGURE 3 shows the preferred encasement of the capacitor of this invention. A coating 30 of resinous material completely covers the end caps 20 and capacitance section 10 of FIGURE 2 to provide the structure shown in cross-section in FIGURE 3. If desired, resin coating 30 may be permitted to extend up each lead-wire a short distance beyond cup 24 to ensure against voids at the weld between the component parts of terminal 20. The resin coating 30 is preferably deposited by dry-powder coating techniques. A preferred technique is to heat section 10 and its attached terminals 20, and then contact the heated assembly with powdered epoxy resin. The epoxy coating is then cured by heat treatment accompanied by revolving the assembly along its axis to establish an extremely smooth and impervious encasement of the capacitor. This coating also provides a highly satisfactory base for the stamping of identifying indicia.

Those skilled in the art should understand that other resins are suitable for coating 30 of this invention, for example, silicones, phenolics, and diallyl phthalate. In a like manner, it should be understood that the preferred method of deposition of coating 30, which is dry powder coating, could be replaced by other means, such as spraying.

The epoxy resin of the preferred embodiment of this invention could also be applied in a solvent system, with suitable provision being made for driving off the solvent between successive passes through the spraying equipment. However, it is desirable to employ a straight epoxy system which is free of solvent so as to remove the possibility that pores might be produced in the coating by the evolution of the solvent. Thus, multiple spray coatings of solvent-free epoxy constitutes the spray method that is best suited for this invention.

One of the advantages of the capacitor construction of this invention resides in the short production time needed for the straight line assembly operations. Less than a day is required for rolling and curing capacitance section 10, soldering terminal 20 to section 10, and masking and spraying to provide coating 30. There is no impregnation or other time consuming step, such as in the prior art of pouring and setting of resin end seals, which would prevent the use of straight line assembly techniques.

The following specific example is recited of a preferred embodiment of the structure and procedures for producing a film capacitor according to this invention. However, it should be understood that this example is illustrative only and should not be construed to be limitative beyond the scope of the appended claims.

Two strips of polyethylene terephthalate (Mylar) 9/16" wide x 0.00025" thick were rolled as spacers between two aluminum foils 7/16" wide and 0.00025" thick. The interleaved alternate layers of Mylar and aluminum foil were rolled on a 1/16" mandrel with the two foils in substantial alignment to provide full effective capacitive overlap. The Mylar films were so related to the aluminum foils as to provide a 1/16" margin of Mylar on each end of the capacitance section. This construction was rolled until a diameter of 0.28" was obtained. A 1" tab of hot tinned copper 1/16" wide x 0.0015" thick was inserted into the winding in contact with each of the foils mid-way through the effective length of the section. The tab in contact with one foil extended from one end of the section, and the tab in contact with the other foil extended from the opposite end. The capacitance section was cured for one hour at about 105° C., and then for three hours at 125° C. to provide a rigid self-sustaining body with the tabs effectively imprisoned therein. This construction provided a capacitance value of about 0.1 mfd. End-caps of hot tinned brass having an O.D. of 0.30" and an I.D. of 0.285" and a wall length of 0.06" were fitted on the ends of the cured capacitance section. The tabs were laid flat against the ends of the section and extended out around the wall of the respective end-caps, where each tab was spot welded to the exterior wall of its end-cap. The end-caps were secured on the section by resistance heating to a point which softened the outer wraps of Mylar to flow into intimate contact with the bottoms and walls of the end-caps. The capacitance section and end-cap assembly was then coated with an epoxy resin by the dry-powder technique of heating the assembly to 85° C. and impinging dry epoxy powder thereon and then curing the coating at 85° C. for approximately three minutes.

As many apparently widely different embodiments of this invention may be made without departing from the spirit and scope hereof, it is to be understood that the invention is not limited to the specific embodiments hereof except as defined in the appended claims.

What is claimed is:

1. A capacitor comprising a tab-wound capacitance section having electrodes separated by and enveloped in plastic film, a conductive tab in electrical contact with each of said electrodes and extending beyond an end of said section, a metallic end cap encompassing an end of said section and being electrically united to said tab and secured in plastic-to-metal bond with the plastic material of said plastic film envelope, a lead-wire secured to said end cap in axial alignment with said section, and a resin coating over said section and said end cap.

2. A capacitor comprising a tab-wound capacitance section having a pair of electrodes separated by and enveloped in polyester film, a conductive tab in electrical contact with one of said pair of electrodes and extending beyond one end of said section, another conductive tab in electrical contact with the other of said pair of electrodes and extending beyond the opposite end of said section, a metallic end-cap mounted on each end of said section and secured in plastic-to-metal bond with the polyester material of said polyester film, said tab and said another tab being welded to the end-cap at the respective end of said section, a lead-wire secured to each of said end-caps in axial alignment with said section, and a resin coating over said section and said end-caps.

3. The capacitor as defined in claim 2 wherein said electrical contact is a welded joint.

References Cited in the file of this patent

UNITED STATES PATENTS

| | | |
|---|---|---|
| 1,900,093 | Blake et al. | Mar. 7, 1933 |
| 2,047,273 | Kopinski | July 14, 1936 |
| 2,808,357 | Lamphier et al. | Oct. 1, 1957 |
| 2,939,060 | Cotton et al. | May 31, 1960 |

FOREIGN PATENTS

| | | |
|---|---|---|
| 569,202 | Great Britain | May 11, 1945 |
| 575,697 | Germany | May 2, 1933 |